UNITED STATES PATENT OFFICE.

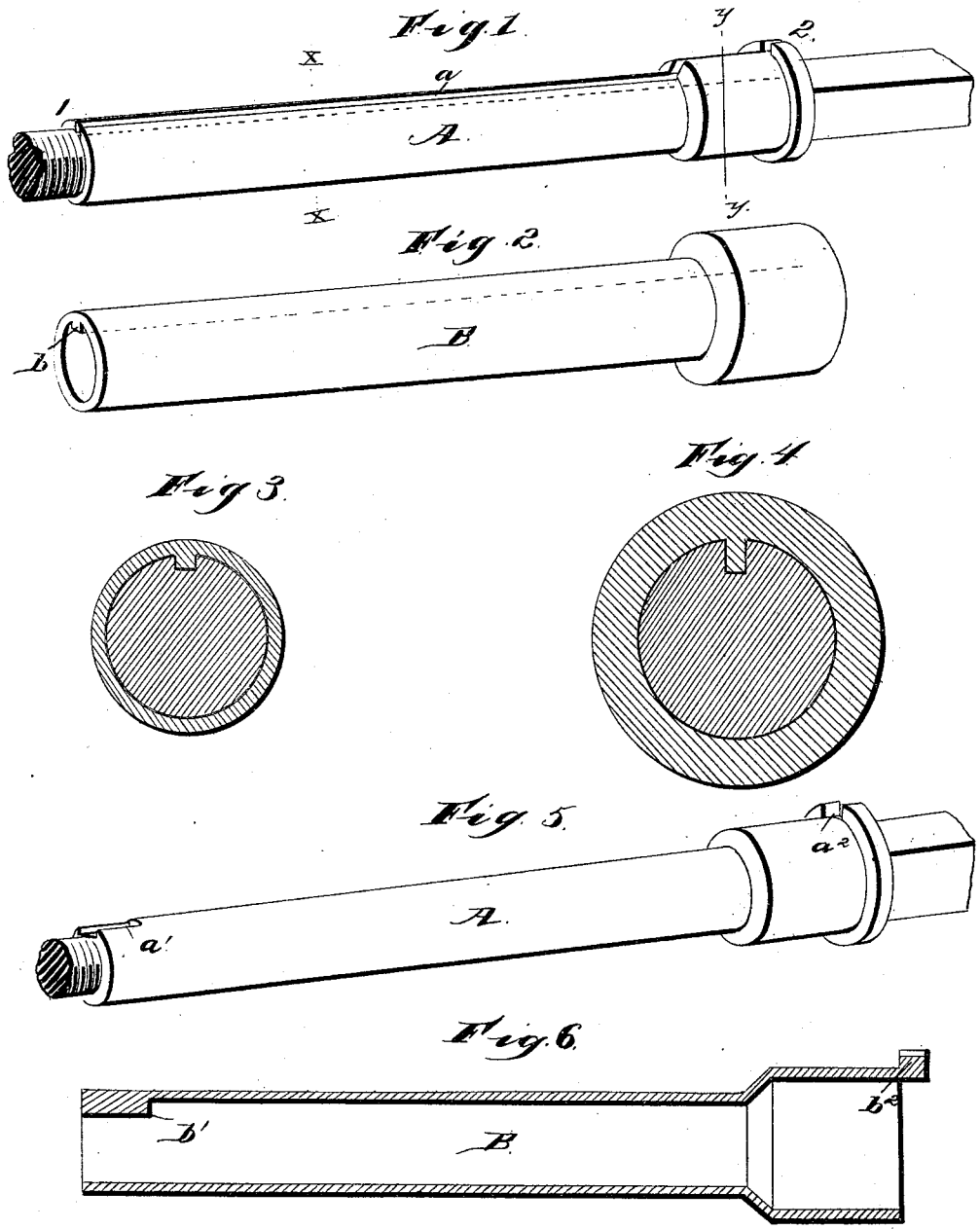

HENRY WILLIAM NOTT, OF CAMERON, TEXAS.

AXLE-SKEIN.

SPECIFICATION forming part of Letters Patent No. 370,080, dated September 20, 1887.

Application filed June 16, 1887. Serial No. 241,546. (No model.)

*To all whom it may concern:*

Be it known that I, HENRY WILLIAM NOTT, a citizen of the United States, residing at Cameron, in the county of Milam and State of Texas, have invented a new and useful Improvement in Axle-Skeins, of which the following is a specification.

My invention relates to an improvement in axle-skeins; and it consists in the construction and arrangement of the parts of the same, which will be more fully hereinafter described, and particularly pointed out in the claims.

The object of my invention is to provide an axle skein or bushing for covering the axle, thereby preventing wear directly upon the same and preserving the axle. I attain this object by the construction illustrated in the accompanying drawings, wherein like letters of reference indicate similar parts in the several views, and in which—

Figure 1 is a perspective view of a portion of an axle. Fig. 2 is a perspective view of my improved skein or bushing. Fig. 3 is a cross-sectional view on the line $x\ x$ of Fig. 1, showing the bushing applied in connection with the axle. Fig. 4 is a similar view on the line $y\ y$ of Fig. 1, showing the bushing or skein in connection with the axle. Fig. 5 is a perspective view of a modified form of construction of the axle. Fig. 6 is a longitudinal sectional view of a modified form of skein or bushing.

A indicates the journal or spindle of the axle with a groove formed therein, said groove, $a$, extending from 1 to 2 through the collar up to the square part of the axle.

B is the metal bushing or skein, fitting closely outside of the journal A, and having a rib, $b$, formed therein and extending entirely therethrough, which is adapted to fit in the groove $a$ of the journal or spindle of the axle A. The bushing or skein B is formed of the same configuration as the bearing portion A of the axle-beam, the rib $b$ thereof resting in the groove $a$ of the said journal-bearing. When the said bushing or skein B is mounted upon the axle A and the rib $b$ is in engagement with the groove $a$, the said bushing or skein is prevented from turning on the journal-bearing of the axle A by the engagement of the rib $b$ with the groove $a$ in the said journal-bearing.

As shown in Figs. 5 and 6, a groove, $a'$, is formed at the nut end of the journal and a notch, $a^2$, in the collar thereof. The skein in this instance is also formed of the same configuration as the journal-bearing of the axle; but with that portion thereof which engages with the nut end of the bearing of the axle a short rib or lug, $b'$, is formed with the internal portion thereof, while with the outer portion of the said bushing or skein, which rests adjacent to the collar of the axle, a projection, $b^2$, is formed. When the two parts are adjusted one upon the other, as hereinbefore set forth, the short rib or lug $b'$ engages with the recess or groove $a'$ in the axle and the projection $b^2$ with the notch $a^2$, formed in the collar of the axle. Thus it will be seen that a mode of securement is obtained which is equally as effective as the extended rib. If, however, it is desired to further secure the bushing or skein in connection with the axle, pins or screws may be used to hold the bushing from turning and provide an additional re-enforcement therefor.

The bushing or skein is to be made of steel, brass, or any desired metal, and of slightly smaller diameter than the axle upon which it is to be applied, being adapted to be heated and shrunk upon the axle, as will be readily understood. When the axles and boxes become worn enough to give the wheels too much side-play, the old bushing can be removed by punch and hammer, and new bushing, with the shell slightly increased in thickness, can be put on the old axle, causing the wheel to run as true as when new, and at a comparatively small cost. The bushing is intended both for axles with a shoulder and for axles that are straight from the nut end to the collar. It will be understood that in straight axles without any shoulder the groove would not be any deeper at the collar end of the journal than at the nut end, except where it passes through the collar.

In the manufacture of my improved bushing or skein I propose to arrange the same for various thicknesses and sizes of axle-bearings, and to apply numbers in connection therewith, whereby any one of said bushings or skeins can be ordered by number and exactly fit the axle-bearing to which it is to be applied.

It will be understood that an oil-channel may be readily formed in the bushing, and that the said bushings or skeins may be made of such thickness of metal as not to weaken the axle.

The novelty and utility of my improved device being obviously apparent and appreciable, it is unnecessary to further enlarge upon the same herein. It will be also understood that the herein-described bushings or skeins are intended for use in connection with iron or steel axles, but may be used in connection with wooden axles, if desired.

I am aware that it is not new to provide the spindle of an axle with a sleeve or bushing, and I make no broad claim thereto.

I am also aware that an axle-skein has heretofore been provided consisting of two circular bands connected by a segmental bar and provided with ribs which engage a groove formed in the spindle of the axle, and such construction I disclaim.

Having thus described my invention, I claim—

1. The combination of the axle-spindle grooved longitudinally and the bushing entirely surrounding the axle-spindle and ribbed longitudinally to engage the same, the said bushing being shrunk on the axle-spindle, substantially as set forth.

2. The combination of the axle-spindle having a collar at its inner end and provided with a longitudinal groove at its outer end, and a notch in the collar at its inner end, and the bushing having a rib which engages the groove and a projection which engages the notch in the collar, substantially as specified.

In testimony that I claim the foregoing as my own I have hereto affixed my signature in presence of two witnesses.

HENRY WILLIAM NOTT.

Witnesses:
   J. B. WOLF,
   J. N. BARBER.